US012620742B2

(12) United States Patent
Wang

(10) Patent No.: US 12,620,742 B2
(45) Date of Patent: May 5, 2026

(54) FEMALE TERMINAL, SOCKET, BATTERY PACK, POWER TOOL AND POWER TOOL SYSTEM

(71) Applicant: Greenworks (Jiangsu) Co., Ltd., Changzhou (CN)

(72) Inventor: Haibin Wang, Changzhou (CN)

(73) Assignee: Greenworks (Jiangsu) Co., Ltd., Changzhou (CN)

( * ) Notice: Subject to any disclaimer, the term of this patent is extended or adjusted under 35 U.S.C. 154(b) by 417 days.

(21) Appl. No.: 18/300,394

(22) Filed: Apr. 14, 2023

(65) Prior Publication Data

US 2023/0344162 A1 Oct. 26, 2023

(30) Foreign Application Priority Data

Apr. 25, 2022 (CN) .......................... 202210442978.8

(51) Int. Cl.
| | |
|---|---|
| *H01R 12/58* | (2011.01) |
| *H01M 50/296* | (2021.01) |
| *H01R 13/11* | (2006.01) |
| *H01R 13/24* | (2006.01) |
| *H01R 13/629* | (2006.01) |
| *H02J 7/00* | (2006.01) |

(52) U.S. Cl.
CPC ...... *H01R 13/2407* (2013.01); *H01M 50/296* (2021.01); *H01R 13/11* (2013.01); *H01R 13/629* (2013.01); *H02J 7/0045* (2013.01)

(58) Field of Classification Search
CPC .... H01R 12/58; H01R 12/7088; H01R 13/11; H01R 13/113; H01R 13/2407; H01R 13/629
See application file for complete search history.

(56) References Cited

U.S. PATENT DOCUMENTS

| | | | | |
|---|---|---|---|---|
| 8,282,413 B2 * | 10/2012 | Fukumoto | ............ | H01R 13/707 |
| | | | | 439/500 |
| 9,112,292 B2 * | 8/2015 | Ogura | ................ | H01M 50/204 |

(Continued)

FOREIGN PATENT DOCUMENTS

| | | |
|---|---|---|
| CN | 107086394 A | 8/2017 |
| CN | 113300135 A | 8/2021 |

(Continued)

*Primary Examiner* — Abdullah A Riyami
*Assistant Examiner* — Thang H Nguyen

(57) ABSTRACT

A female terminal, a socket, a battery pack, a power tool and a power tool system are provided to improve a problem of limited discharge capacity between a conventional battery pack and a power tool. The female terminal is used for an electrical connection with a male terminal, and the female terminal includes: a first electrical connector and a second electrical connector. The first electrical connector is provided with a first resilient opening to be electrically connected and inserted into the male terminal. The second electrical connector is arranged inside the first electrical connector, and is provided with a second resilient opening to be electrically connected and inserted into the male terminal. Wherein, during an electrical connection, the male terminal sequentially enters the first resilient opening and the second resilient opening in sequence, and is electrically connected to the first electrical connector and the second electrical connector.

14 Claims, 11 Drawing Sheets

(56) References Cited

U.S. PATENT DOCUMENTS

| | | | | |
|---|---|---|---|---|
| 9,601,729 B2 * | 3/2017 | Naito | .................. | H01M 50/296 |
| 2008/0061738 A1 * | 3/2008 | Hanawa | ................ | H01M 10/48 |
| | | | | 320/112 |
| 2013/0143452 A1 * | 6/2013 | Yoshikawa | .......... | H01R 13/187 |
| | | | | 439/863 |
| 2013/0244504 A1 * | 9/2013 | Ogura | ................ | H01M 50/247 |
| | | | | 439/759 |
| 2014/0302369 A1 * | 10/2014 | Naito | .................. | H01M 50/213 |
| | | | | 429/100 |
| 2015/0229056 A1 * | 8/2015 | Morello | .............. | H01R 13/113 |
| | | | | 439/370 |
| 2015/0249237 A1 * | 9/2015 | Naito | .................... | H01R 12/58 |
| | | | | 429/7 |
| 2016/0294093 A1 * | 10/2016 | Ogura | .................. | H01M 50/50 |
| 2023/0091858 A1 * | 3/2023 | Kim | .................... | H01M 50/296 |
| | | | | 429/123 |

FOREIGN PATENT DOCUMENTS

| | | | | | |
|---|---|---|---|---|---|
| CN | 107086394 | * | 8/2022 | .......... | H01R 13/115 |
| KR | 20210148750 A | | 12/2021 | | |
| WO | WO-2021246676 A1 | * | 12/2021 | ......... | H01M 50/284 |
| WO | WO-2022185954 A1 | * | 9/2022 | .......... | H01R 13/113 |

* cited by examiner

300

300

322

312

313     3110     314  311

L3

323  3210  321

FEMALE TERMINAL, SOCKET, BATTERY PACK, POWER TOOL AND POWER TOOL SYSTEM

TECHNICAL FIELD

The disclosure relates to a field of power supplies, in particular to a female terminal, a socket, a battery pack, a power tool and a power tool system.

BACKGROUND

With the improvement of people's living standards, there are higher requirements for the quality of life and work. People's requirements for tools are getting higher and higher. In the lithium power tool industry, the discharge capacity of lithium battery packs is limited, and in the past it could only be applied to some products with low power. When the positive and negative poles are connected, high-power discharge often causes the temperature of the connection being too high due to the small contact area of the male terminal, which may cause the risk of melting the plastic parts and catching fire. Moreover, in previous products, the male terminals were placed side by side or front to back, which needs a lot of space. The conventional structure of the male terminals cannot meet the requirements of the battery pack for a small space volume. Therefore, it is necessary to provide a female terminal, socket, battery pack, power tool and power tool system to increase the discharge capacity between the battery pack and the power tool in a limited space.

SUMMARY

The disclosure provides a female terminal, a socket, a battery pack, a power tool and a power tool system, so as to relieve a problem of limited discharge capacity between a battery pack and a power tool.

The disclosure provides the female terminal used to be electrically connected with a male terminal. The female terminal includes a first electrical connector and a second electrical connector. The first electrical connector is provided with a first resilient opening configured for an electrical connection and insertion of the male terminal. The second electrical connector is arranged inside the first electrical connector, and is provided with a second resilient opening configured for an electrical connection and insertion of the male terminal. Wherein, when electrically connected, the male terminal sequentially enters the first resilient opening and the second resilient opening in sequence, and is electrically connected to the first electrical connector and the second electrical connector.

In an embodiment of the female terminal of the disclosure, both the first electrical connector and the second electrical connector includes at least one set of clamping parts, each set of the clamping parts includes two clamping arms, the two clamping arms are arranged opposite to each other, and are bent toward each other to form the first resilient opening or the second resilient opening.

In an embodiment of the female terminal of the disclosure, the two clamping arms on both sides of the first resilient opening and/or the second resilient opening are respectively provided with protrusions, and the protrusions on the two clamping arms are correspondingly facing each other to form the first resilient opening or the second resilient opening.

In an embodiment of the female terminal of the disclosure, the protrusion includes an arc body and a connecting body, a first side of the connecting body is connected with the clamping arm, and a second side of the connecting body is connected with the arc body.

In an embodiment of the female terminal of the disclosure, a first side of the connecting body is smoothly connected with one of the clamping arms in the clamping part through a rounded corner, and a second side of the connecting body on the first electrical connector is inclined to a second clamping arm arranged opposite thereto, an angle between the connecting body on the first electrical connector and an insertion direction of the male terminal is from 30° to 40°, and an angle between the connecting body on the second electrical connector and the insertion direction of the male terminal is from 15° to 25°.

In an embodiment of the female terminal of the disclosure, a side of the arc body facing away from the connecting body is provided with a flange to guide an insertion of the male terminal.

In an embodiment of the female terminal of the disclosure, a first side of the flange is tangent to and connected with the side of the arc body facing away from the connecting body, a second side of the flange extends obliquely to an outside, an angle between the flange on the first electrical connector and the insertion direction of the male terminal is from 40° to 50°, and an angle between the flange on the second electrical connector and the insertion direction of the male terminal is from 50° to 60°.

In an embodiment of the female terminal of the disclosure, the first electrical connector and/or the second electrical connector includes two sets of clamping parts, the first resilient opening or the second resilient opening formed in each set of the clamping parts extends along a straight line, and the straight line is perpendicular to the insertion direction of the male terminal.

In an embodiment of the female terminal of the disclosure, the first electrical connector and/or the second electrical connector include a pin piece, and the pin piece is correspondingly inserted into a terminal fixing part.

In an embodiment of the female terminal of the disclosure, the first resilient opening and the second resilient opening are distributed on a same insertion line, and a distance between the first resilient opening and the second resilient opening along the insertion line is from 10 mm to 15 mm.

In an embodiment of the female terminal of the disclosure, the first electrical connector and/or the second electrical connector comprise a limiting body, and the limiting body limits the second electrical connector.

The disclosure further provides a socket used to be electrically connected with a plug with two male terminals. The socket includes at least two female terminals used to be electrically plugged with the two male terminals to form a current loop. The female terminal includes the first electrical connector and the second electrical connector. The first electrical connector is provided with the first resilient opening configured for an electrical connection and insertion of the male terminal. The second electrical connector is arranged inside the first electrical connector, and is provided with the second resilient opening configured for an electrical connection and insertion of the male terminal. Wherein, when electrically connected, the male terminal sequentially enters the first resilient opening and the second resilient opening in sequence, and is electrically connected to the first electrical connector and the second electrical connector.

The disclosure further provides a battery pack. A battery interface of the battery pack includes at least two female terminals electrically connected with a positive pole and a negative pole of the battery pack respectively. The female terminal includes the first electrical connector and the second electrical connector. The first electrical connector is provided with the first resilient opening configured for an electrical connection and insertion of the male terminal. The second electrical connector is arranged inside the first electrical connector, and is provided with the second resilient opening configured for an electrical connection and insertion of the male terminal. Wherein, when electrically connected, the male terminal sequentially enters the first resilient opening and the second resilient opening in sequence, and is electrically connected to the first electrical connector and the second electrical connector.

The disclosure further provides a power tool. A tool interface of the power tool is provided with at least two female terminals, the two female terminals are configured to be electrically plugged with the two male terminals to form the current loop. The female terminal includes the first electrical connector and the second electrical connector. The first electrical connector is provided with the first resilient opening configured for an electrical connection and insertion of the male terminal. The second electrical connector is arranged inside the first electrical connector, and is provided with the second resilient opening configured for an electrical connection and insertion of the male terminal. Wherein, when electrically connected, the male terminal sequentially enters the first resilient opening and the second resilient opening in sequence, and is electrically connected to the first electrical connector and the second electrical connector.

The disclosure further provides a power tool system. The power tool system includes the power tool and the battery pack. The battery pack is electrically connected with the power tool through the male terminal and the female terminal. The female terminal includes the first electrical connector and the second electrical connector. The first electrical connector is provided with the first resilient opening configured for an electrical connection and insertion of the male terminal. The second electrical connector is arranged inside the first electrical connector, and is provided with the second resilient opening configured for an electrical connection and insertion of the male terminal. Wherein, when electrically connected, the male terminal sequentially enters the first resilient opening and the second resilient opening in sequence, and is electrically connected to the first electrical connector and the second electrical connector.

The female terminal of the disclosure outputs or inputs current through a superimposed use of the first electrical connector and the second electrical connector, which increases a current flow capacity of the female terminal and improves the discharge capacity or power bearing capacity of the female terminal. In a relatively narrow space, a contact area of the male terminal is increased, and a current flow area of the male terminal is increased. An application of the female terminal to the socket, battery pack, power tool or power tool system may increase a current flow capacity between related components and improve a stability of the equipment.

BRIEF DESCRIPTION OF THE DRAWINGS

In order to explain technical solutions of embodiments of the disclosure more clearly, the following will briefly introduce drawings used in a description of the embodiments or the conventional art. Obviously, the drawings in the following description are only some embodiments of the disclosure. For those of ordinary skill in the art, other drawings may be obtained based on these drawings without creative work.

PART NUMBER DESCRIPTION

100—power tool, 110—tool interface, 200—battery pack, 210—battery pack interface, 220—catch, 211—positive plugging blade terminal groove, 212—negative plugging blade terminal groove, 230—battery pack housing, 240—terminal fixing part, 241—female terminal mounting groove, 250—single-piece electrical connector, 300—female terminal, 310—first electrical connector, 311—first resilient opening, 312—first pin piece, 313—limiting body, 314—first compartment, 315—first straight line, 3110—first clamping part, 3111—first clamping outer arm, 3112—second clamping outer arm, 3130—first protrusion, 3131—first arc body, 3132—first connecting body, 3133—first flange, 3140—second protrusion, 3141—second connecting body, 3142—second arc body, 3143—second flange, 320—second electrical connector, 321—second resilient opening, 322—second pin piece, 323—second compartment, 3210—second clamping part, 3211—first clamping inner arm, 3212—second clamping inner arm, 3230—third protrusion, 3231—third arc body, 3232—third connecting body, 3233—third flange, 3240—fourth protrusion, 3241—fourth arc body, 3242—fourth connecting body, 3243—fourth flange, 325—second straight line, 301—first resilient opening a, 302—first resilient opening b, 303—second resilient opening a, 304—second resilient opening b.

DETAILED DESCRIPTION

The following describes the implementation of the disclosure through specific embodiments, and those skilled in the art can easily understand other advantages and effects of the disclosure from the content disclosed in this specification. The disclosure may also be implemented or applied through other different specific embodiments. Various details in this specification may also be modified or changed based on different viewpoints and applications without departing from the disclosure. It should be noted that, the following embodiments and the features in the embodiments can be combined with each other without conflict. It should further be understood that the terms used in the examples of the disclosure are used to describe specific embodiments, instead of limiting the protection scope of the disclosure. The test methods that do not indicate specific conditions in the following examples are usually in accordance with conventional conditions, or conditions recommended by each manufacturer.

It should be noted that the terms such as "upper", "lower", "left", "right", "middle" and "one" cited in this specification are only for the convenience of description and are not used to limit the scope of the disclosure. The change or adjustment of the relative relationship should also be regarded as the applicable scope of the disclosure without substantial change in the technical content.

Figure 1:
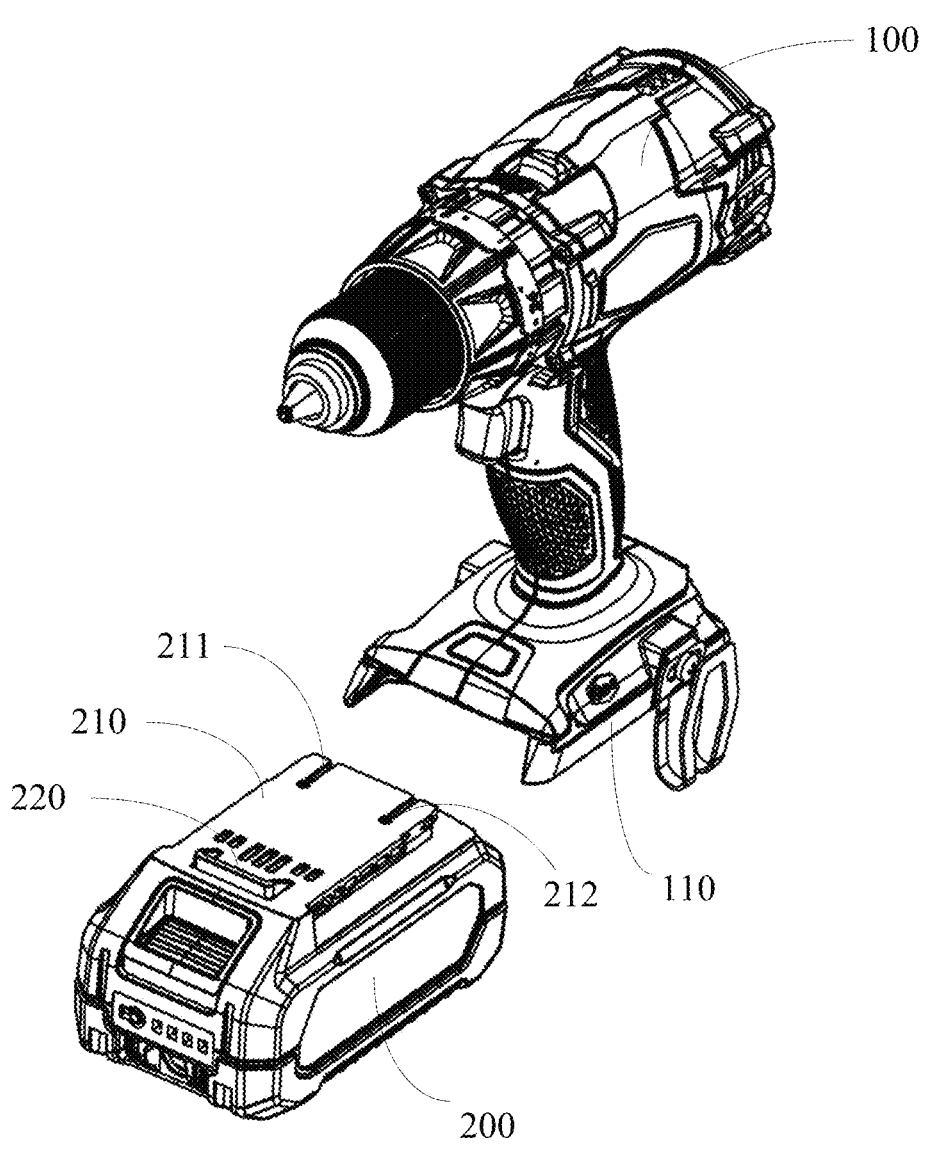
FIG. 1 is a schematic view of a power tool system of the disclosure.
Figure 2:
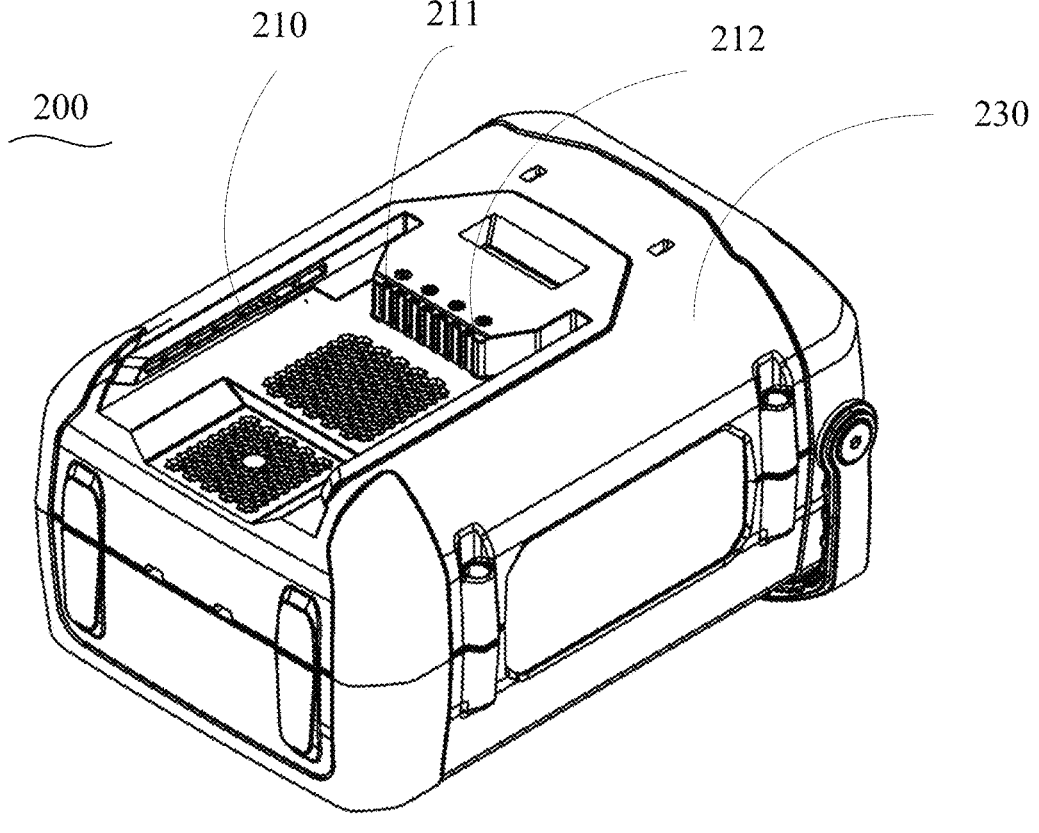
FIG. 2 is a three-dimensional schematic view of a battery pack of the disclosure in an embodiment.
Figure 3:
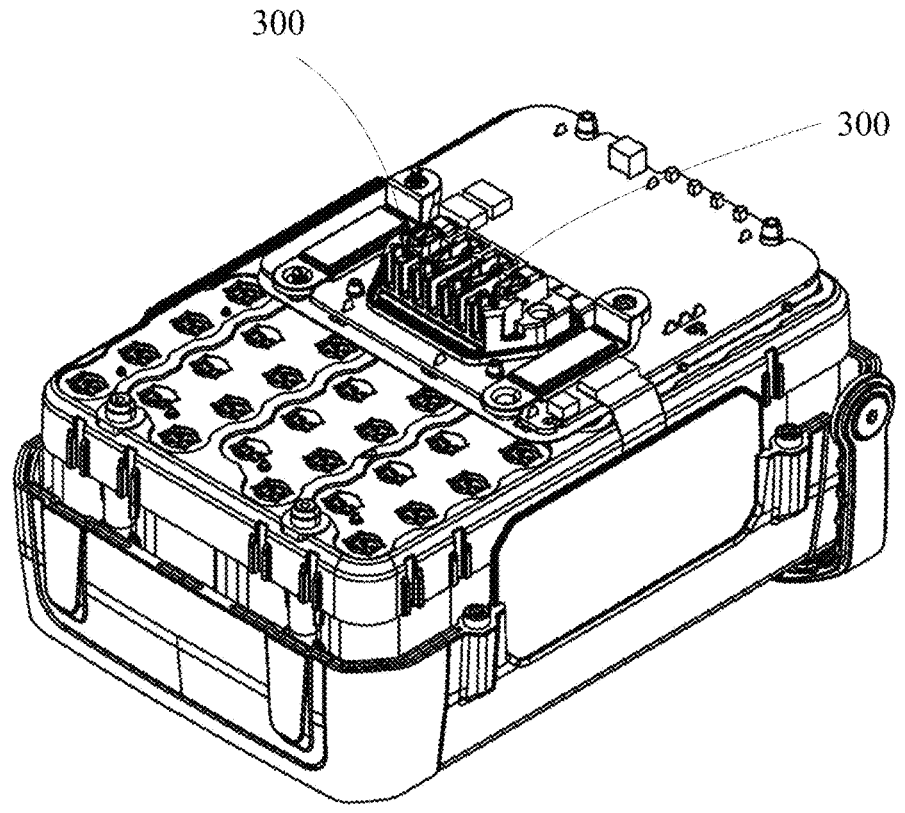
FIG. 3 is a three-dimensional schematic view of the battery pack of the disclosure after part of a housing is removed in an embodiment.
Figure 4:
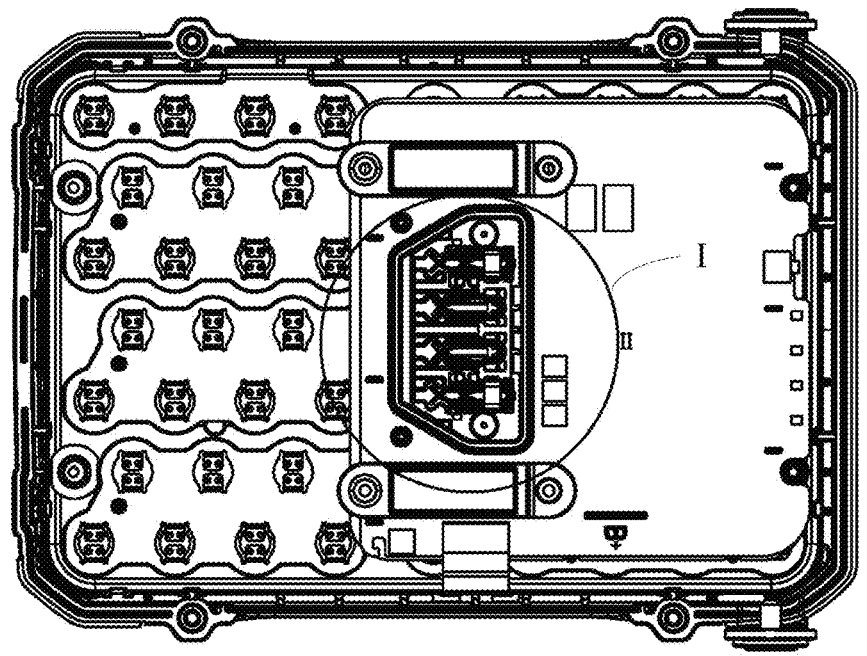
FIG. 4 is a top view of the battery pack of the disclosure after part of the housing is removed in an embodiment.
Figure 5:
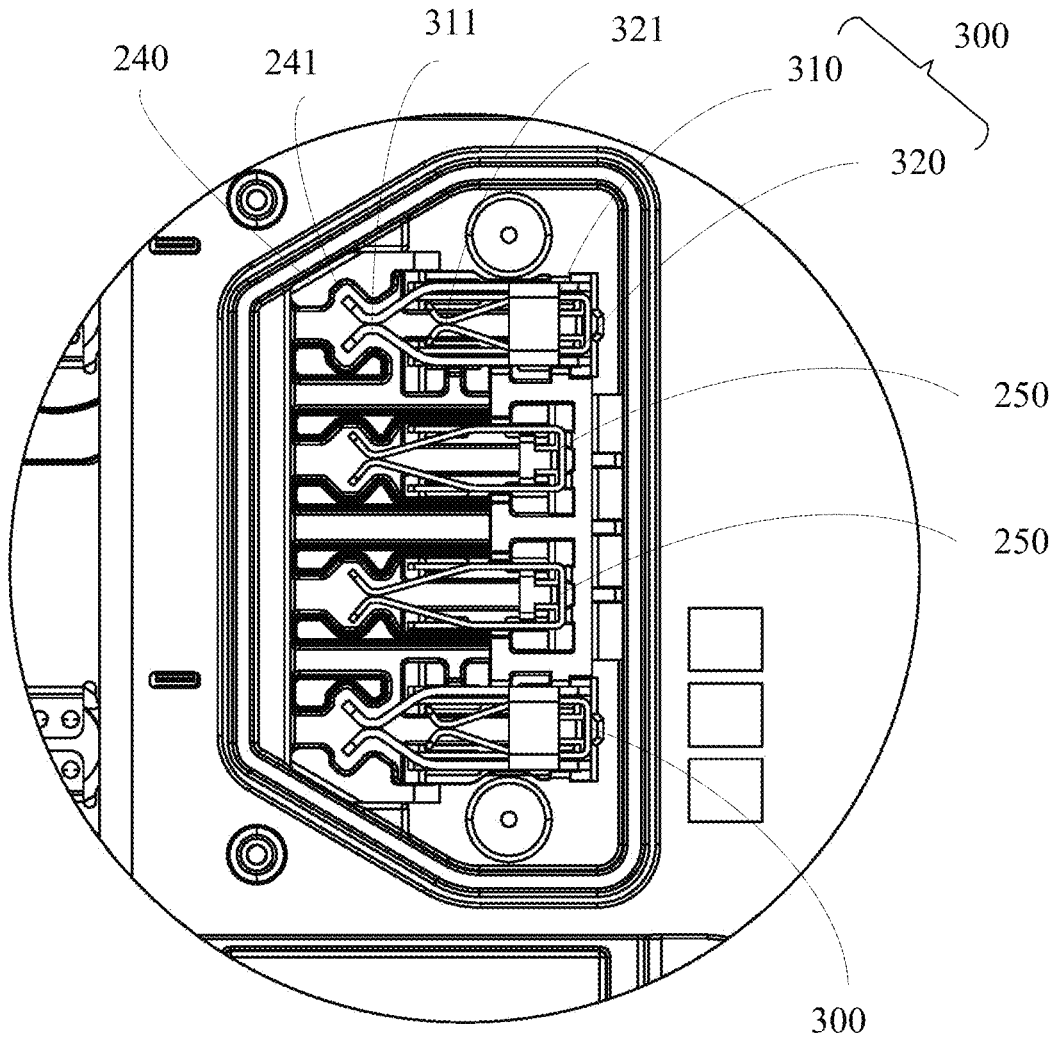
FIG. 5 is a partial enlarged view of an I region in FIG. 4.

Please refer to FIG. 1. The disclosure provides a power tool system. The power tool system includes a power tool 100 and a battery pack 200. A specific type of the power tool 100 is not limited, and it may be any tool powered by a battery pack, such as an electric drill, a hedge trimmer, a string trimmer, a blower, a chain saw, a lawn mower, an electric hammer, a pressure washer, a snow thrower, a vacuum cleaner, a floor washing machine, a robotic mower, a riding mower, etc. The battery pack 200 may be a single voltage battery pack, a double voltage battery pack or a triple voltage battery pack. The battery pack 200 is electrically connected with the power tool 100 directly or indirectly through a corresponding male terminal and female terminal 300, and form a current loop to supply power to the power tool 100. It should be noted that a position of the female terminal 300 in the disclosure is not limited, for example, it may be directly arranged on the battery pack 200 or the power tool 100. When the female terminal 300 is mounted on the battery pack 200, the male terminal is arranged on the corresponding power tool 100, and when the female terminal 300 is mounted on the electric tool 100, the male terminal is arranged on the battery pack 200.

Please refer to FIG. 1 through FIG. 5. In an embodiment of the disclosure, the battery pack 200 is provided. The battery pack 200 may be applied to the above power tool system. Compared with the traditional battery pack, a battery interface 210 of the battery pack 200 includes at least two female terminals 300. The battery pack 200 is provided with a terminal fixing part 240 therein, and the two female terminals 300 are respectively arranged in corresponding female terminal mounting grooves 241 on the terminal fixing part 240. A battery pack housing 230 of the battery pack 200 is respectively provided with a positive plugging blade terminal groove 211 and a negative plugging blade terminal groove 212, so that the male terminal can enter the battery pack housing 230 and be inserted into the corresponding female terminal 300. The two female terminals 300 are respectively electrically connected with the positive pole and the negative pole of the battery pack 200 to form a positive female terminal and a negative female terminal. A tool interface 110 of the power tool 100 is provided with a corresponding positive male terminal (not shown) and negative male terminal (not shown). When the battery pack 200 is connected with the tool interface 110 of the power tool 100 through the battery interface 210, the positive male terminal on the power tool 100 is electrically plugged with the positive female terminal 300 on the battery pack 200, the negative male terminal on the power tool 100 is electrically plugged with the negative female terminal 300 on the battery pack 200, thereby forming the current loop to provide a power support for the power tool 100. It should be noted that other terminals in the battery interface 210 in the disclosure, such as communication terminals, current transmitted by the communication terminals is relatively weak, so a structural form of a single-piece electrical connector 250 may be adopted. In addition, the above-mentioned battery pack 200 includes not only the female terminal 300 with the above-mentioned special structure, but also some other structures of a conventional battery pack, such as a battery cell (not shown), a catch 220 and the like. These structures may refer to the conventional structures of all suitable battery packs, which will not be repeated here.

Please refer to FIG. 1. In an embodiment of the disclosure, the power tool 100 is provided. The power tool 100 may be applied to the above power tool system. Compared with the traditional power tool 100, the tool interface 110 of the power tool 100 includes at least two female terminals 300. The two female terminals 300 are the positive female terminal and the negative female terminal of the power tool 100 respectively, and the battery interface 210 of the battery pack 200 is provided with the corresponding positive male terminal and negative male terminal. When the battery pack 200 is connected with the tool interface 110 of the power tool 100 through the battery interface 210, the positive male terminal on the battery pack 200 is electrically connected with the positive female terminal 300 on the power tool 100, and the negative male terminal on the battery pack 200 is electrically plugged with the negative female terminal 300 on the power tool 100, thereby forming the current loop to provide power support for the power tool 100. It should be noted that, in addition to the above-mentioned special structure female terminal 300, the above-mentioned power tool 100 further includes other structures of the power tool 100, such as a housing, a driving device, working parts, communication terminals, and the like. These structures may refer to the conventional structures of all suitable power tools, which will not be repeated here.

In an embodiment of the disclosure, a socket is provided. The socket is used for an electrical connection with a plug with two male terminals, and the socket may be used in the above power tool system to indirectly realize an electrical connection between the power tool 100 and the battery pack 200. Compared with the traditional socket, the socket includes at least two female terminals 300, and the two female terminals 300 are respectively electrically connected with the positive terminal and the negative terminal of the battery pack 200, thereby forming the positive female terminal and the negative female terminal. When the plug is electrically connected with the socket, the positive male terminal is electrically connected with the positive female terminal 300, and the negative male terminal is electrically connected with the negative female terminal 300, thereby forming the current loop to provide power support for the power tool 100. Those skilled in the art may understand that the two female terminals 300 of the socket may also be electrically connected with the positive terminal and the negative terminal of the power tool 100 respectively, thereby forming the positive female terminal 300 and the negative female terminal 300. When the plug is electrically connected with the socket, the current loop may also be formed to provide power support for the power tool 100. It should be noted that, in addition to the above-mentioned special structural female terminal 300, the above-mentioned socket may includes other structures of the socket, such as a housing, a female terminal fixing plate, and wires, and the like. These structures may refer to the conventional structures of all suitable sockets, which will not be repeated here.

Please refer to FIG. 6 through FIG. 15. In an embodiment of the disclosure, the female terminal 300 is provided. The female terminal 300 may be used on the above-mentioned battery pack 200, power tool 100, power tool system or socket, and be electrically connected with the corresponding male terminal. The female terminal 300 includes a first electrical connector 310 and a second electrical connector 320. Both the first electrical connector 310 and the second electrical connector 320 are made of conductive materials. A first compartment 314 capable of housing the second electrical connector 320 is arranged on a side of the first electrical connector 310 away from the male terminal, and a side of the first compartment 314 facing the male terminal is provided with a first resilient opening 311 for an electrical connection and insertion of the male terminal. The second electrical connector 320 is arranged in the first compartment 314 of the first electrical connector 310, a second compartment 323 capable of housing the male terminal is arranged inside a side of the second electrical connector 320 away from the male terminal, and a second resilient opening 321 for the electrical connection and insertion of the male terminal is arranged on a side of the second electrical connector 320 facing the first resilient opening 311. When the male terminal is electrically plugged into the female terminal 300, the corresponding male terminal extends into the second compartment 323 through the first resilient opening 311 on an outside and the second resilient opening 321 on an inside in sequence. And the male terminal is electrically connected with the first electrical connectors 310 on both sides of the first resilient opening 311, and is also electrically connected with the second electrical connectors 320 on both sides of the second resilient opening 321 at the same time.

Figure 10:
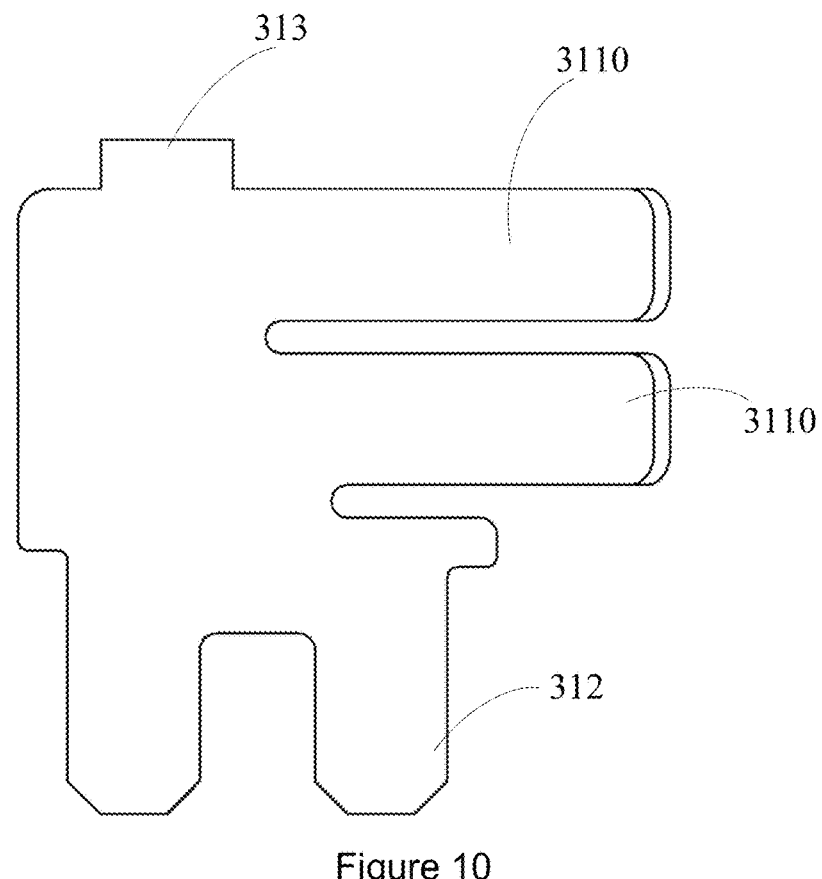
FIG. 10 is a front view of a first electrical connector in an embodiment of the disclosure.
Figure 11:
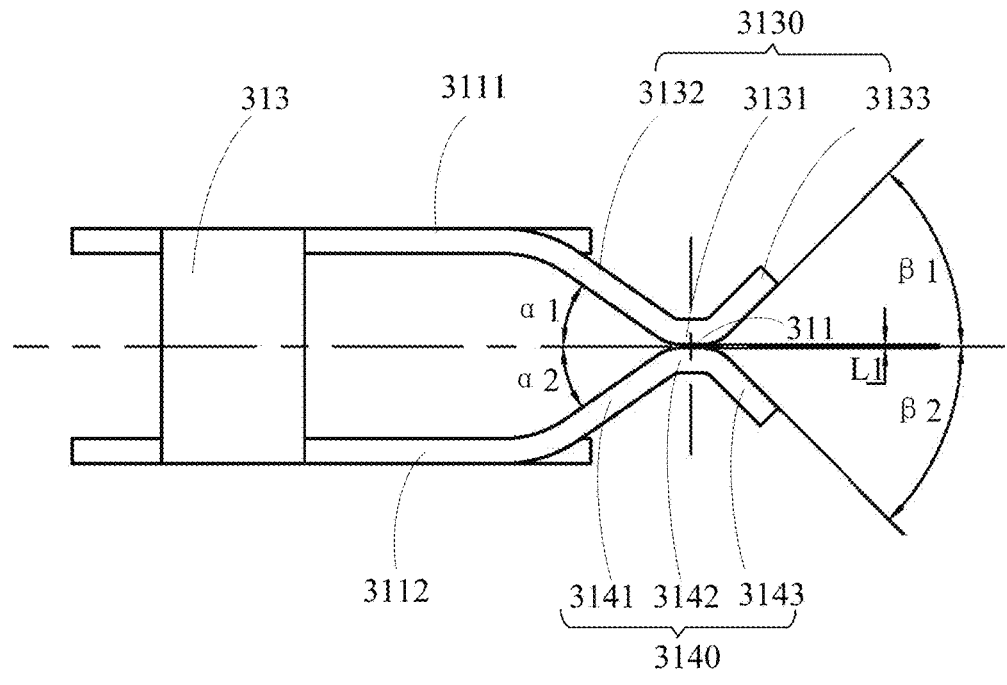
FIG. 11 is a top view of the first electrical connector in an embodiment of the disclosure.
Figure 12:
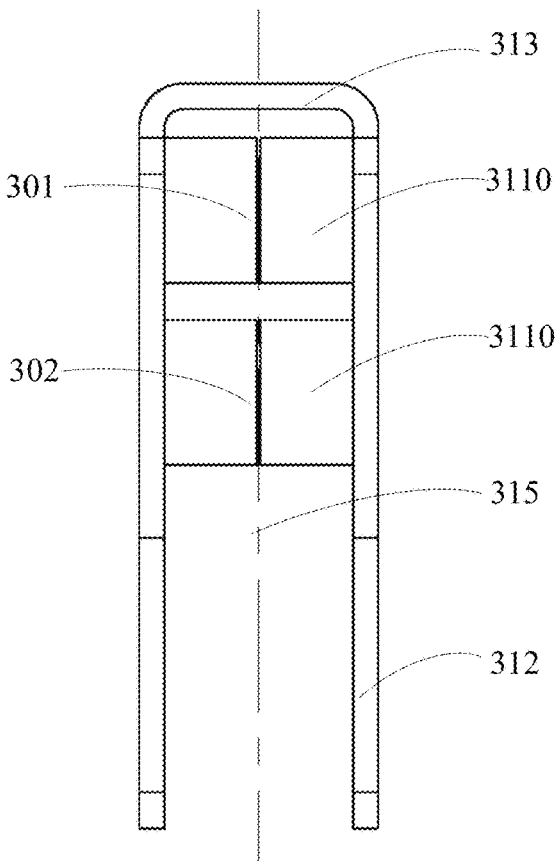
FIG. 12 is a left view of the first electrical connector in an embodiment of the disclosure.

Please refer FIG. 10 through FIG. 11. As long as the male terminal can be inserted smoothly and the first resilient opening 311 is in stable electrical contact with the male terminal after the male terminal is inserted, the first resilient opening 311 in the disclosure may be any conventional resilient opening form suitable for a male terminal insertion. In an example of the disclosure, the first electrical connector 310 includes at least one set of first clamping parts 3110, and the first clamping part 3110 includes a first clamping outer arm 3111 and a second clamping outer arm 3112. Both the first clamping outer arm 3111 and the second clamping outer arm 3112 are made of sheet-shaped conductive material with certain hardness and certain elasticity, such as conventional metal materials such as copper sheet and aluminum sheet. The first clamping outer arm 3111 and the second clamping arm 3112 are oppositely arranged and cantilevered out. The first resilient opening 311 is formed at free ends of the first clamping outer arm 3111 and the second clamping outer arm 3112, and the first resilient opening 311 extends along a straight line. When the male terminal is inserted into the first resilient opening 311, the first clamping outer arm 3111 and the second clamping outer arm 3112 on both sides are squeezed to deform and open to both sides to ensure a smooth passage of the male terminal. When the male terminal is removed, the first clamping outer arm 3111 and the second clamping outer arm 3112 on both sides recover and deform, so as to return to a closed or slightly open state of the first resilient opening 311.

In this embodiment, the first clamping outer arm 3111 and the second clamping outer arm 3112 in the first clamping part 3110 are bent toward each other to form the first resilient opening 311. The first clamping outer arm 3111 is provided with a first protrusion 3130 on a side facing the second clamping outer arm 3112, and the second clamping outer arm 3112 is provided with a second protrusion 3140 on a side facing the first clamping outer arm 3111. The first protrusion 3130 and the second protrusion 3140 protrude toward each other and form the first resilient opening 311. A width L1 of the first resilient opening 311 perpendicular to an insertion direction when the male terminal is not inserted is from 0 mm to 0.2 mm, for example, 0 mm, 0.1 mm and 0.2 mm. 0.1 mm is selected in this embodiment. In other embodiments, the first resilient opening 311 may also be formed in other ways. For example, it is possible to directly surfacing conductive material on an opposite side of the first clamping outer arm 3111 and the second clamping outer arm 3112 of the first clamping part 3110 to form the first resilient opening 311, or the first resilient opening 311 may also be formed between the first clamping outer arm 3111 and the second clamping outer arm 3112 by welding parts on the first clamping outer arm 3111 and the second clamping outer arm 3112.

Please refer to FIG. 11. In an embodiment of the disclosure, the first protrusion 3130 includes a first arc body 3131 and a first connecting body 3132. One side of the first connecting body 3132 is connected with the first clamping outer arm 3111, and the other side of the first connecting body 3132 is connected with the first arc body 3131. The second protrusion 3140 includes a second arc body 3142 and a second connecting body 3141, one side of the second connecting body 3141 is connected with the second clamping outer arm 3112, and the other side of the second connecting body 3141 is connected with the second arc body 3142. In some embodiments, the first connecting body 3132 in the disclosure is in a flat shape. One side of the first connecting body 3132 is smoothly connected with the first clamping outer arm 3111 through a rounded corner, the other side of the first connecting body 3132 is inclined to the second clamping outer arm 3112 at an opposite side, and is tangent to the first arc body 3131 connected thereto. The second connecting body 3141 in the disclosure is also in a flat shape. One side of the second connecting body 3141 is smoothly connected with the second clamping outer arm 3112 through the rounded corner, and the other side of the second connecting body 3141 is inclined to the first clamping outer arm 3111 at the opposite side and is tangent to the second arc body 3142 connected thereto. Inclination angles of the first connecting body 3132 and the second connecting body 3141 are not limited. Preferably, in an embodiment of the disclosure, an angle α1 between the first connecting body 3132 and an insertion direction of the male terminal is from 30° to 40°. An angle α2 between the second connecting body 3141 and the insertion direction of the male terminal is also from 30° to 40°. Within this angle range, when the male terminal is inserted, an extrusion force of the male terminal may be decomposed, not only may the first clamping outer arm 3111 or the second clamping outer arm 3112 corresponding to the force resist a plastic deformation caused by the extrusion force of the male terminal, but also the first clamping outer arm 3111 and the second clamping outer arm 3111 may have a higher elasticity, which may stably hold the inserted male terminal. It should be noted that the angle α1 between the first connecting body 3132 and the insertion direction of the male terminal and the angle α2 between the second connecting body 3141 and the insertion direction of the male terminal may be any value between 30° and 40°, such as 30°, 32°, 35°, 38° and 40°. In this embodiment, the first clamping outer arm 3111 and the second clamping outer arm 3112 are symmetrically arranged on the first electrical connector 310, and the angle α1=α2=35°.

Please refer to FIG. 11. In an embodiment of the disclosure, the first protrusion 3130 further includes a first flange 3133 arranged on a side of the first arc body 3131 away from the first connecting body 3132 to guide the insertion of the male terminal. One side of the first flange 3133 is tangent to and connected with the side of the first arc body 3131 away from the first connecting body 3132, and the other side of the first flange 3133 extends outward. The second protrusion 3140 further includes a second flange 3143 arranged on a side of the second arc 3142 away from the second connecting body 3141 to guide the insertion of the male terminal. One side of the second flange 3143 is tangent to and connected with a side of the second arc body 3142 away from the second connecting body 3141, and the other side of the second flange 3143 extends outward. The first flange 3133 and the second flange 3143 on both sides form an approximately V-shaped guiding structure. In order to achieve a better guidance, in some embodiments, an angle β1 between the first flange 3133 and the insertion direction of the male terminal is from 40° to 50°, and an angle β2 between the second flange 3143 and the insertion direction of the male terminal is also from 40° to 50°. In this angle range, not only may there be a better guiding effect, when the male terminal abuts against the first flange 3133 or the second flange 3143, an insertion force may have a larger component force along a direction of a guiding surface, but also it may prevent the first arc body 3131 or the second arc-shaped body 3142 on both sides of the first resilient opening 311 from being rolled up toward the first resilient opening 311 due to an insertion friction force. It should be noted that the angle β1 between the first flange 3133 and the insertion direction of the male terminal and the angle β2 between the second flange 3143 and the insertion direction of the male terminal may be any value between 40° and 50°, such as 40°, 42°, 45°, 47° and 50°. In this embodiment, the first clamping outer arm 3111 and the second clamping outer arm 3112 are arranged symmetrically, and the angle β1=β2=45°.

Figure 13:
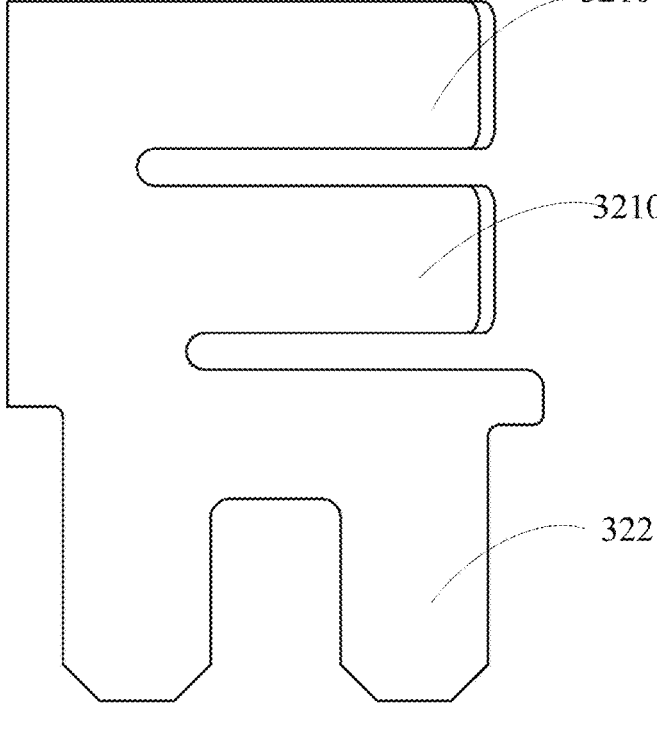
FIG. 13 is a front view of a second electrical connector in an embodiment of the disclosure.
Figure 14:
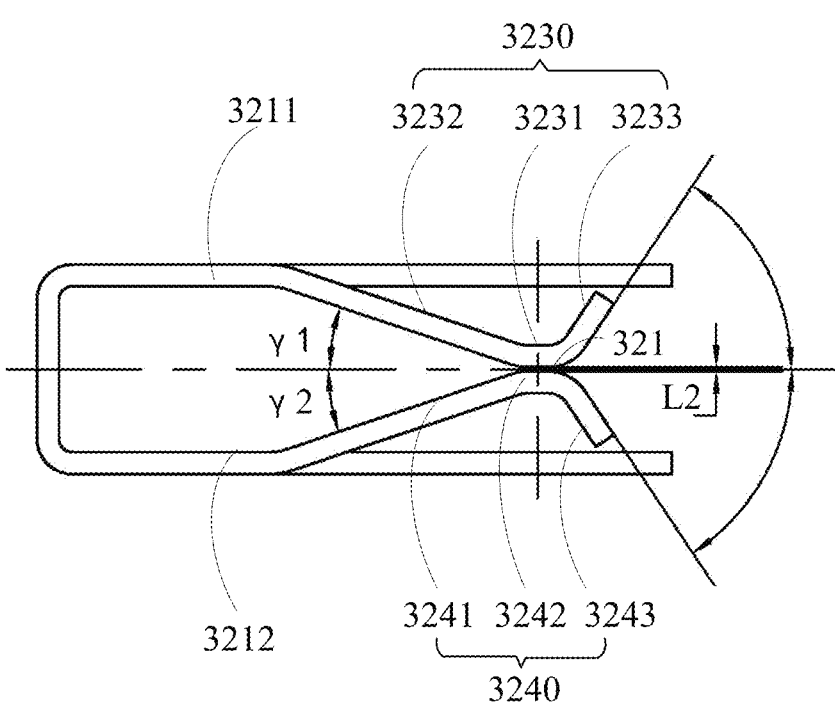
FIG. 14 is a top view of the second electrical connector in an embodiment of the disclosure.
Figure 15:
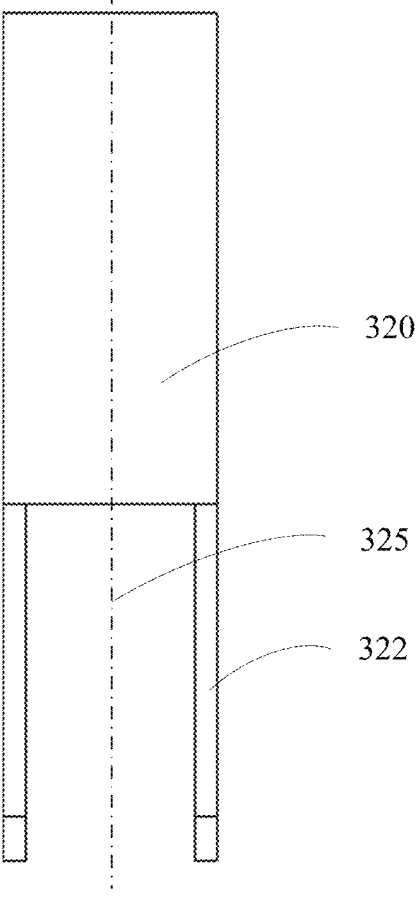
FIG. 15 is a left view of the second electrical connector in an embodiment of the disclosure.
Figure 16:
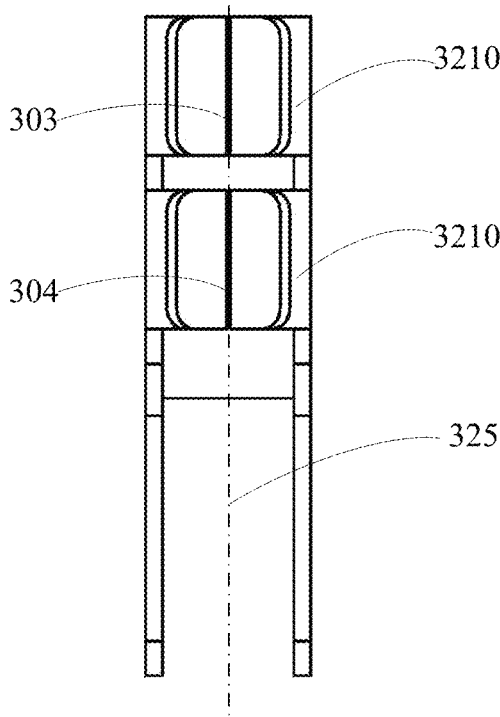
FIG. 16 is a right view of the second electrical connector in an embodiment of the disclosure.
Figure 17:
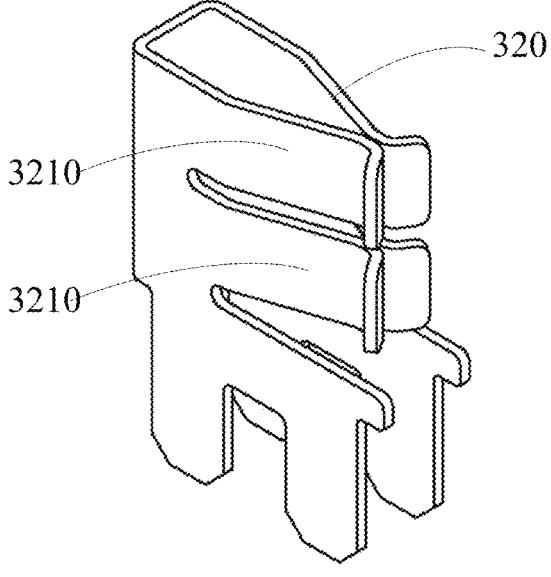
FIG. 17 is a three-dimensional view of the second electrical connector in an embodiment of the disclosure.
Figure 18:
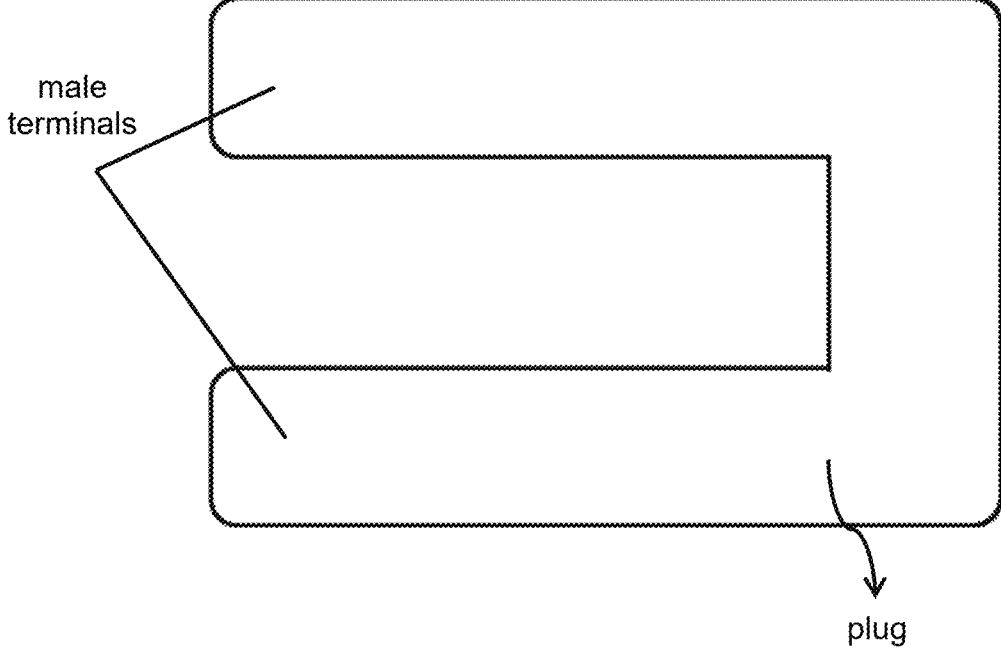
FIG. 18 is a schematic view of a plug with two male terminals.

Please refer to FIG. 13 through FIG. 15. As long as the male terminal can be inserted smoothly and the second resilient opening 321 is in stable contact with the male terminal after the male terminal is inserted, the second resilient opening 321 in the disclosure may be any conventional resilient opening form suitable for a male terminal insertion. In an embodiment of the disclosure, the second electrical connector 320 includes at least one set of second clamping parts 3210, and the second clamping part 3210 includes a first clamping inner arm 3211 and a second clamping inner arm 3212. The first clamping inner arm 3211 and the second clamping inner arm 3212 are made of sheet-shaped conductive material with certain hardness and certain elasticity, such as conventional metal materials such as copper sheet and aluminum sheet. The first clamping inner arm 3211 and the second clamping inner arm 3212 are oppositely arranged and cantilevered out. The second resilient opening 321 is formed at free ends of the first clamping inner arm 3211 and the second clamping inner arm 3212, and the second resilient opening 321 extends along a straight line. When the male terminal is inserted into the second resilient opening 321, the first clamping inner arm 3211 and the second clamping inner arm 3212 on both sides are squeezed to deform and open to both sides to ensure a smooth passage of the male terminal. When the male terminal is removed, the first clamping inner arm 3211 and the second clamping inner arm 3212 on both sides recover and deform, so as to return to a closed or slightly open state of the second resilient opening 321.

In this embodiment, the first clamping inner arm 3211 and the second clamping inner arm 3212 are bent toward each other to form the second resilient opening 321. The first clamping inner arm 3211 is provided with a third protrusion 3230 on a side facing the second clamping inner arm 3212, and the second clamping inner arm is provided with a fourth projection 3240 on a side facing the first clamping inner arm 3211. The third protrusion 3230 and the fourth protrusion 3240 on both sides protrude correspondingly toward each other to form the second resilient opening 321. A width L2 of the second resilient opening 321 perpendicular to the insertion direction when the male terminal is not inserted may be any value between 0 mm and 0.2 mm, such as 0 mm, 0.1 mm and 0.2 mm. 0.1 mm is selected in this embodiment. In other embodiments, the second resilient opening 321 may be formed in other ways, For example, it is possible to directly surfacing conductive material on an opposite side of the first clamping inner arm 3211 and the second clamping inner arm 3212 of each second clamping part 3210, or the second resilient opening 321 may also be formed between the first clamping inner arm 3211 and the second clamping inner arm 3212 by welding parts on the first clamping inner arm 3211 and the second clamping inner arm 3212.

In an embodiment of the disclosure, the third protrusion 3230 includes a third arc body 3231 and a third connecting body 3232. One side of the third connecting body 3232 is connected with the first clamping inner arm 3211, and the other side of the third connecting body 3232 is connected with the third arc body 3231. In some embodiments, the third connecting body 3232 in the disclosure is in a flat shape. One side of the third connecting body 3232 is smoothly connected with the first clamping inner arm 3211 through the rounded corner, and the other side of the third connecting body 3232 is inclined to the second clamping inner arm 3212 at an opposite side, and is tangent to the third arc body 3231. The fourth protrusion 3240 includes a fourth arc body 3241 and a fourth connecting body 3242, one side of the fourth connecting body 3242 is connected with the second clamping inner arm 3212, and the other side of the fourth connecting body 3242 is connected with the fourth arc body 3241. In some embodiments, the fourth connecting body 3242 in the disclosure is in a flat shape, one side of the fourth connecting body 3242 is smoothly connected with the second clamping inner arm 3212 through the rounded corner, and the other side of the fourth connecting body 3242 is inclined to the first clamping inner arm 3211 at the opposite side and is tangent to the fourth arc body 3241 connected thereto. Angles of the third connecting body 3232 and the fourth connecting body 3242 are not limited. In an embodiment of the disclosure, an angle γ1 between the third connecting body 3232 and the insertion direction of the male terminal is from 15° to 25°, and an angle γ2 between the fourth connecting body 3242 and the insertion direction of the male terminal is also from 15° to 25°. Within this angle range, when the male terminal is inserted, a squeezing force on the male terminal may have a larger moment on the first clamping inner arm 3211 and the second clamping inner arm 3212, which is conducive to a smooth opening of the second resilient opening 321 and can relatively reduce a resistance of the insertion of the male terminal. It should be noted that the angle γ1 between the third connecting body 3232 and the insertion direction of the male terminal and the angle γ2 between the fourth connecting body 3242 and the insertion direction of the male terminal may be any value between 15° and 25°, such as 15°, 17°, 19°, 22° and 25°. Considering a size of the conventional electrical connector male terminal, and the first clamping inner arm 3211 and the second clamping inner arm 3212 in this embodiment are arranged symmetrically, in this embodiment, γ1=γ2=19°.

In an embodiment of the disclosure, the third protrusion 3230 further includes a third flange 3233 arranged on a side of the third arc body 3231 away from the third connecting body 3232 to guide the insertion of the male terminal. The fourth protrusion 3240 further includes a fourth flange 3243 arranged on a side of the fourth arc body 3241 away from the fourth connecting body 3242 to guide the insertion of the male terminal. One side of the third flange 3233 is tangent to and connected with the side of the third arc body 3231 away from the third connecting body 3232, and the other side of the third flange 3233 extends obliquely in a straight line towards a side opposite to the second clamping inner arm 3212. One side of the fourth flange 3243 is tangent to and connected with the side of the fourth arc body 3241 away from the fourth connecting body 3242, and the other side of the fourth flange 3243 extends obliquely in a straight line towards a side opposite to the first clamping inner arm 3211. The third flange 3233 and the fourth flange 3243 on both sides form an approximately V-shaped guiding structure. In order to achieve a better guidance, the first resilient opening 311 and the second resilient opening 321 are arranged along the same straight line. In some embodiments, an angle 61 between the third flange 3233 and the insertion direction of the male terminal is from 50° to 60°. An angle θ2 between the fourth flange 3243 and the insertion direction of the male terminal is also from 50° to 60°. In this angle range, not only may there be a better guiding effect, but also it is easier to open than the first flange 3133 and the second flange 3143. It should be noted that the angle 61 between the third flange 3233 and the insertion direction of the male terminal and the angle 62 between the fourth flange 3243 and the insertion direction of the male terminal may be any value between 50° and 60°, such as 50°, 52°, 55°, 57° and 60°. Considering that the first clamping inner arm 3211 and the second clamping inner arm 3212 are arranged symmetrically in this embodiment, the angle θ1=θ2=56°.

Please refer to FIG. 9, FIG. 12, FIG. 13 and FIG. 15 through FIG. 17. The number of the first clamping part 3110 and the second clamping part 3210 in the disclosure may be one set, two sets or more. In an embodiment of the disclosure, the first electrical connector 310 includes two sets of first clamping parts 3110. The first resilient opening 311 formed by the two sets of first clamping parts 3110 includes a first resilient opening a 301 and a first resilient opening b 302, and the first resilient opening a 301 and the first resilient opening b 302 extend along a first straight line 315 perpendicular to the insertion direction of the male terminal. The second electrical connector 320 includes two sets of second clamping parts 3210, and the second resilient opening 321 formed by the two second clamping portions 3210 includes a second resilient opening a 303 and a second resilient opening b 304. The second resilient opening a 303 and the second resilient opening b 304 extend along a second straight line 325 perpendicular to the insertion direction of the male terminal. The first straight line 315 is parallel to the second straight line 325, and a distance L3 between them along the insertion direction of the male terminal is from 10 mm to 15 mm. The distance L3 between the first straight line 315 and the second straight line 325 along the insertion direction of the male terminal may be any value between 10 mm and 15 mm, for example, it may be 10 mm, 12 mm and 15 mm. 12 mm is selected in this embodiment. The resilient openings formed by the two first clamping parts 3110 are respectively arranged in one-to-one correspondence with the resilient openings formed by the two second clamping parts 3210.

Figure 8:
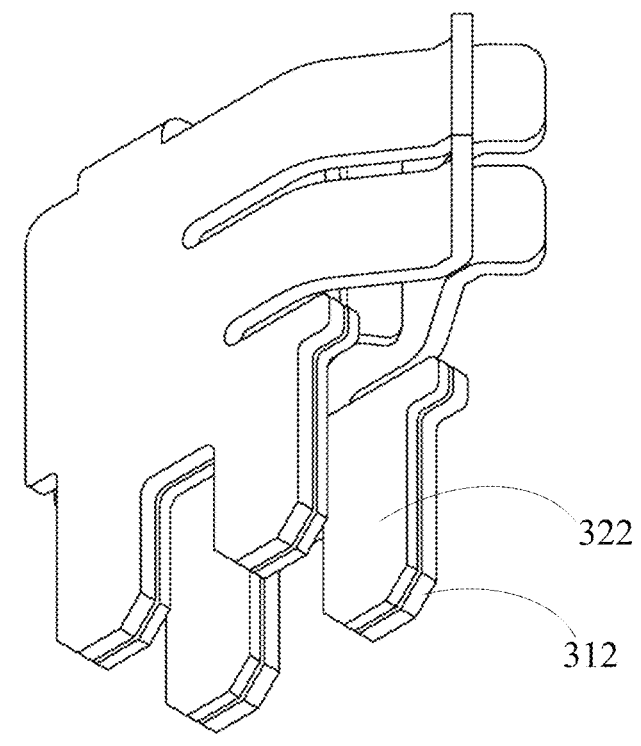
FIG. 8 is a three-dimensional schematic view of yet another angle of the female terminal of the disclosure in an embodiment.
Figure 9:
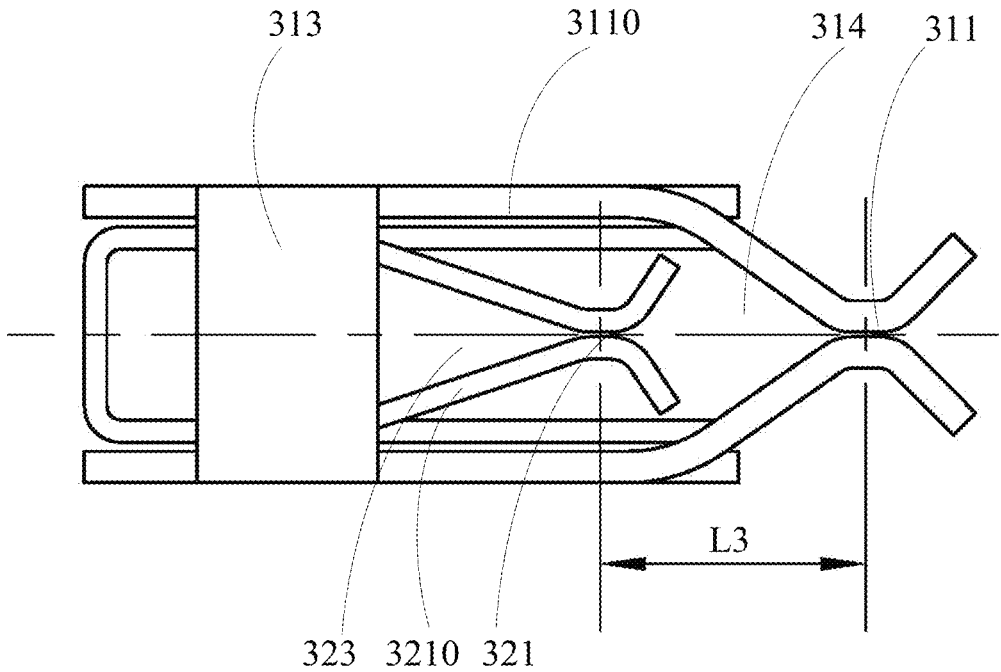
FIG. 9 is a top view of an embodiment of the female terminal of the disclosure.

Please refer to FIG. 8. In an embodiment of the disclosure, in order to facilitate a mounting, the first electrical connector 310 includes a first pin piece 312, and the first pin piece 312 is correspondingly inserted into the terminal fixing part 240. The second electrical connector 320 includes a second pin piece 322, and the second pin piece 322 is also correspondingly inserted on the terminal fixing part 240. In an embodiment of the disclosure, the terminal fixing part 240 is a circuit board, and corresponding mounting holes are arranged on the circuit board. There are four first pin pieces 312, and they are distributed in a rectangular array. One side of the four first pin pieces 312 is connected with the corresponding first clamping outer arm 3111 and the second clamping outer arm 3112 respectively, and the other side of the four first pin pieces 312 protrudes downward. There are also four second pin pieces 322, which are also distributed in a rectangular array. One side of the four second pin pieces 322 are respectively connected with the corresponding first clamping inner arm 3211 and the second clamping inner arm 3212, and the other sides of the four second pin pieces 322 protrude downward. When the first electrical connector 310 and the second electrical connector 320 are mounted in place, the four second pin pieces 322 are respectively close to an inner side of the four first pin pieces 312 correspondingly, and are mounted in the corresponding mounting holes on the circuit board.

Figure 6:
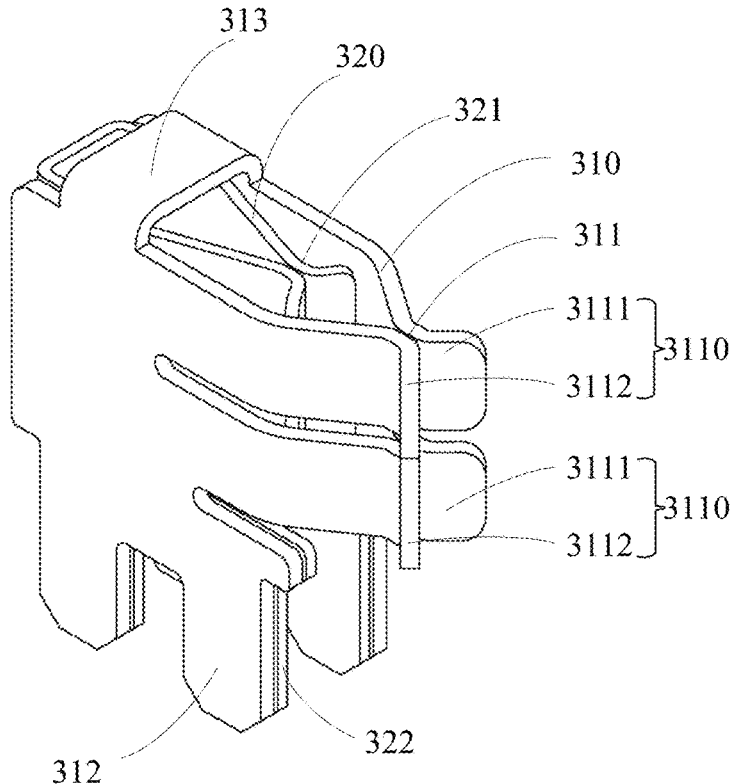
FIG. 6 is a three-dimensional schematic view of a female terminal of the disclosure in an embodiment.
Figure 7:
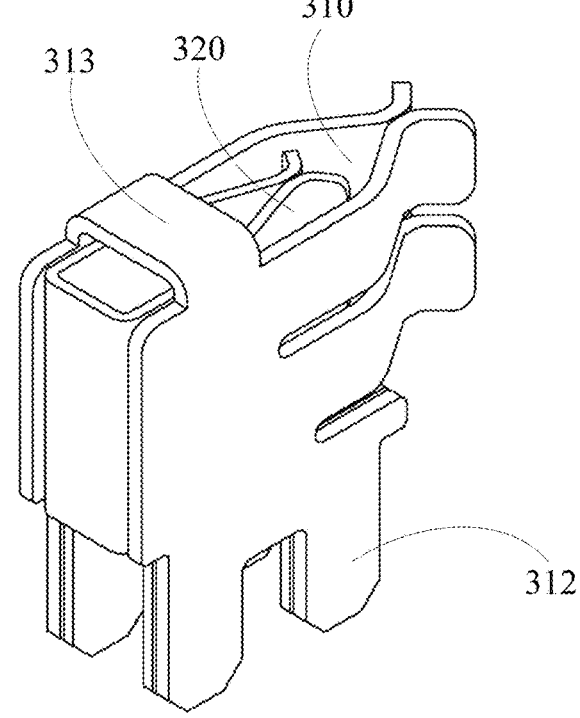
FIG. 7 is a three-dimensional schematic view of another angle of the female terminal of the disclosure in an embodiment.

Please refer to FIG. 6. In order to prevent a displacement of the second electrical connector 320, in an embodiment of the disclosure, the first electrical connector 310 includes a limiting body 313, and the limiting body 313 limits a position of the second electrical connector 320. As long as it can prevent the second electrical connector 320 from jumping out along an extending direction of the first resilient opening 311, a structure of the limiting body 313 may not be too limited. In one embodiment of the disclosure, the limiting body 313 is a protective plate. The protective plate is mounted on the first electrical connector 310, and is arranged in an area where the second electrical connector 320 is mounted correspondingly. One side of the protective plate is connected with the first clamping outer arm 3111, and the other side of the protective plate is connected with the second clamping outer arm 3112.

When the female terminal 300 of the disclosure is provided with only one set of first clamping parts 3110 and one set of second clamping parts 3210 and the male terminal is inserted, current transmission is carried out between the female terminal 300 and the male terminal through four contacts (which means the two contacts on both sides of the first resilient opening 311 and the two contacts on both sides of the second resilient opening 321). At this time, resistances of the four contacts are marked as R1, R2, R3, and R4 respectively. Assuming that a total current passing through the female terminal 300 is 11, a passing voltage is U, and a total resistance of the entire female terminal 300 is $R_{total}$, then $1/R_{total}=1/R1+1/R2+1/R3+1/R4$. Assuming $R1=R2=R3=R4=R$, it is further deduced that $R_{total}=R/4$; the current $I_1=4U/R$. In a conventional female terminal 300, the current transmission is carried out through only two contacts. If it is assumed that resistances of the two contacts are also R, and transmitted current is 12, then a total R of the two contacts is equal to R/2, and $I_2=2U/R$. It may be further deduced that $I_1=2*I_2$, from which it may be seen that under same conditions, an output current or input current through the electrical connector may be increased through the female terminal 300 of the disclosure.

In summary, the female terminal of the disclosure outputs or inputs current by a superimposed use of the first electrical connector and the second electrical connector, which increases a current flow capacity of the female terminal and improves a discharge or power bearing capacity of the female terminal. In a relatively narrow space, a contact area of the male terminal is increased, and a current flow area of the male terminal is increased. An application of the female terminal to the socket, battery pack, power tool or power tool system may increase a current flow capacity between related components and improve a stability of the equipment.

The above-mentioned embodiments merely illustrate the principles and effects of the disclosure, but are not intended to limit the disclosure. Anyone skilled in the art may modify or change the above embodiments without departing from the range of the disclosure. Therefore, all equivalent modifications or changes made by those with ordinary knowledge in the technical field without departing from the range and technic disclosed in the disclosure should still be covered by the claims of the disclosure.

What is claimed is:

1. A female terminal, configured to be electrically connected with a male terminal, comprising:
   a first electrical connector, provided with a first resilient opening configured for an electrical connection and insertion of the male terminal, and
   a second electrical connector, arranged inside the first electrical connector, and provided with a second resilient opening configured for the electrical connection and insertion of the male terminal, wherein
   when electrically connected, the male terminal enters the first resilient opening and the second resilient opening in sequence and is electrically connected to the first electrical connector and the second electrical;
   wherein the first electrical connector comprises four first pin pieces, the second electrical connector comprises four second pin pieces, the four first pin pieces and the four second pin pieces are correspondingly inserted into a terminal fixing part, the four first pin pieces are distributed in a rectangular array, the four second pin pieces are distributed in the rectangular array, and the four second pin pieces are respectively close to an inner side of the four first pin pieces correspondingly.

2. The female terminal according to claim 1, wherein both the first electrical connector and the second electrical connector comprise at least one set of clamping parts, each set of the clamping parts comprises two clamping arms, the two clamping arms are arranged opposite to each other, and are bent toward each other to form the first resilient opening or the second resilient opening.

3. The female terminal according to claim 2, wherein the two clamping arms on both sides of the first resilient opening and/or the second resilient opening are respectively provided with protrusions, and the protrusions on the two clamping arms are correspondingly facing each other to form the first resilient opening or the second resilient opening.

4. The female terminal according to claim 3, wherein the protrusion includes an arc body and a connecting body, a first side of the connecting body is connected with the clamping arm, and a second side of the connecting body is connected with the arc body.

5. The female terminal according to claim 4, wherein a first side of the connecting body is smoothly connected with a first clamping arm in the clamping part through a rounded corner, and a second side of the connecting body is inclined to a second clamping arm arranged opposite thereto, an angle between the connecting body on the first electrical connector and an insertion direction of the male terminal is from 30° to 40° to decompose an extrusion force of the male terminal and enable the first electrical connector to hold the inserted male terminal stably, and an angle between the connecting body on the second electrical connector and the insertion direction of the male terminal is from 15° to 25°.

6. The female terminal according to claim 4, wherein a side of the arc body facing away from the connecting body is provided with a flange to guide an insertion of the male terminal.

7. The female terminal according to claim 6, wherein a first side of the flange is tangent to and connected with the side of the arc body facing away from the connecting body, a second side of the flange extends obliquely to an outside, an angle between the flange on the first electrical connector and the insertion direction of the male terminal is from 40° to 50°, and an angle between the flange on the second electrical connector and the insertion direction of the male terminal is from 50° to 60° to guide the male terminal and prevent the arc body from being rolled up toward the first resilient opening.

8. The female terminal according to claim 2, wherein the first electrical connector and/or the second electrical connector comprise two sets of clamping parts, the first resilient opening or the second resilient opening formed in each set of the clamping parts extends along a straight line, and the straight line is perpendicular to the insertion direction of the male terminal.

9. The female terminal according to claim 1, wherein the first resilient opening and the second resilient opening are distributed on a same insertion line, and a distance between the first resilient opening and the second resilient opening along the insertion line is from 10 mm to 15 mm.

10. The female terminal according to claim 1, wherein the first electrical connector and/or the second electrical connector comprise a limiting body, and the limiting body limits the second electrical connector.

11. A power tool, wherein a tool interface of the power tool is provided with at least two female terminals according to claim 1.

12. A power tool system, comprising:
   a power tool, and
   a battery pack, electrically connected with the power tool through a male terminal and a female terminal according to claim 1.

13. A socket, configured to be electrically connected with a plug with two male terminals, comprising:
   at least two female terminals, configured to be electrically plugged with the two male terminals to form a current loop, the female terminal comprising:

a first electrical connector, provided with a first resilient opening configured for an electrical connection and insertion of the male terminal, and a second electrical connector, arranged inside the first electrical connector, and provided with a second resilient opening configured for an electrical connection and insertion of the male terminal, wherein when electrically connected, the male terminal sequentially enters the first resilient opening and the second resilient opening in sequence, and is electrically connected to the first electrical connector and the second electrical connector;

wherein the first electrical connector comprises four first pin pieces, the second electrical connector comprises four second pin pieces, the four first pin pieces and the four second pin pieces are correspondingly inserted into a terminal fixing part, the four first pin pieces are distributed in a rectangular array, the four second pin pieces are distributed in the rectangular array, and the four second pin pieces are respectively close to an inner side of the four first pin pieces correspondingly.

14. A battery pack, a battery interface of the battery pack comprising:

at least two female terminals, electrically connected with a positive pole and a negative pole of the battery pack respectively, the female terminal comprising:

a first electrical connector, provided with a first resilient opening configured for an electrical connection and insertion of the male terminal, and a second electrical connector, arranged inside the first electrical connector, and provided with a second resilient opening configured for an electrical connection and insertion of the male terminal, wherein when electrically connected, the male terminal sequentially enters the first resilient opening and the second resilient opening in sequence, and is electrically connected to the first electrical connector and the second electrical connector;

wherein the first electrical connector comprises four first pin pieces, the second electrical connector comprises four second pin pieces, the four first pin pieces and the four second pin pieces are correspondingly inserted into a terminal fixing part, the four first pin pieces are distributed in a rectangular array, the four second pin pieces are distributed in the rectangular array, and the four second pin pieces are respectively close to an inner side of the four first pin pieces correspondingly.

*    *    *    *    *